Jan. 30, 1968 J. VISMAN 3,366,247
CYCLONE APPARATUS
Filed Nov. 28, 1966 2 Sheets-Sheet 1
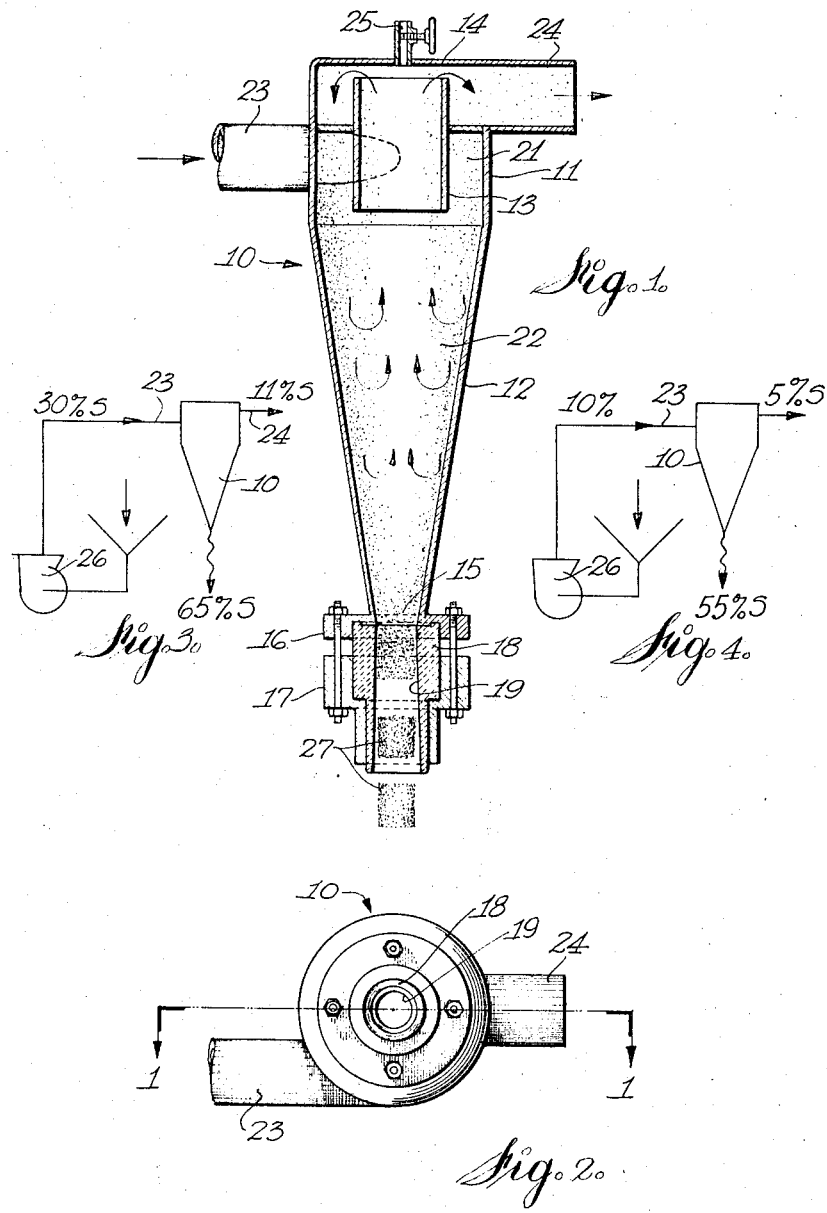
INVENTOR
Jan Visman
BY
Weir, Marshall, MacRae & Lamb
PATENT AGENT

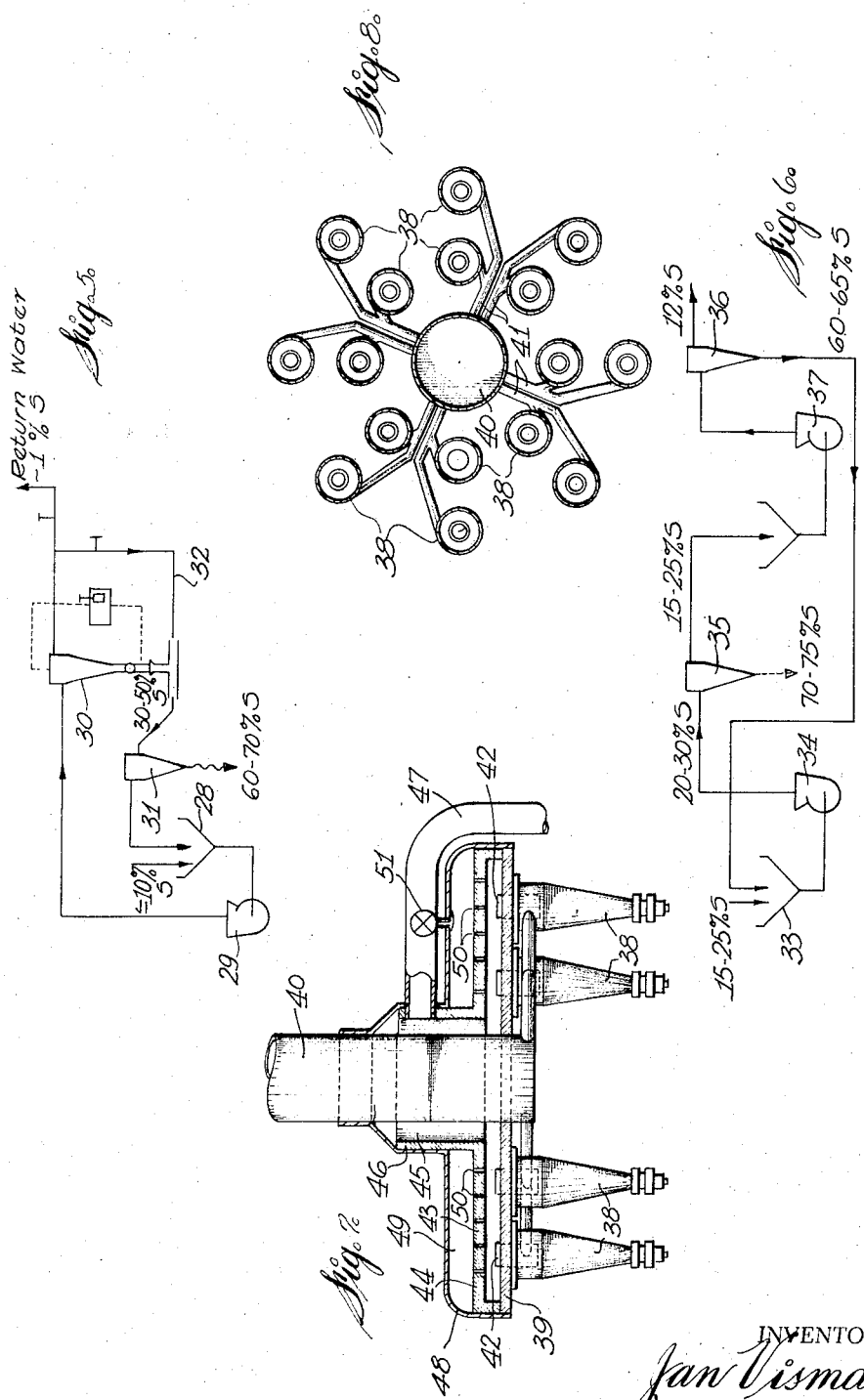

United States Patent Office 3,366,247
Patented Jan. 30, 1968

3,366,247
CYCLONE APPARATUS
Jan Visman, Edmonton, Alberta, Canada, assignor to Canadian Patents and Development Limited, Ottawa, Ontario, Canada, a corporation of Canada
Filed Nov. 28, 1966, Ser. No. 597,322
9 Claims. (Cl. 210—512)

ABSTRACT OF THE DISCLOSURE

A cyclone for removing solids in paste form from liquid suspensions comprising a cylindrical section of minor axial extent and a conical section of major axial extent. A right cylindrical vortex finder is coaxially disposed within the cylindrical section and forms, with the wall of the cylindrical section, an annular chamber. The conical section has a conical chamber communicating with the annular chamber and the interior of the vortex finder. The conical chamber has an apex orifice open to atmosphere. A tubular member is mounted in the conical section and has an axial opening in axial alignment and direct communication with the apex orifice, such axial opening in gradually increasing diameter from the orifice. The device is intended to produce the paste in separate slug form. A feed pipe for the liquid suspension leads tangentially into the annular chamber and a liquid discharge pipe leads from the annular chamber. A valve in the top wall of the cyclone regulates passage of atmospheric air through the axial inlet and the apex orifice.

---

This invention relates to an apparatus for removing solids from liquids.

Effective solids removal from liquids is a desirable procedure in many fields. For instance, the problem of solids removal from effluents is receiving much attention because of increasing industrialization and the growing insistence of government agencies on avoidance of stream pollution.

The removal of materials of coarse particle size (a minimum of about ½ mm. or −28 mesh) may be readily carried out by conventional procedures, such as by screening or natural drainage, but finer materials are not easily removed by such procedures.

It is an object of this invention to provide a device for convenient and effective removal from liquids of solids of a particle size of about minus 28 mesh and including those of low specific gravity (such as coal), and those of high specific gravity (such as ore sands and slimes), in the presence of smaller or larger amounts of ultrafine material of a colloidal nature.

More specifically, it is an object of this invention to provide an apparatus for compacting the solids in a liquid suspension thereof whereby a compact body or a plurality of compact bodies or slugs of granular solids in paste form are produced.

The invention resides in a cyclone for removing solids in paste form from liquid suspensions which comprises a top wall, a tubular wall extending from said top wall and forming a right cylindrical section of minor axial extent and a conical section of major axial extent in coaxial adjoining relation to said cylindrical section, a tubular vortex finder coaxially disposed within said cylindrical section and extending throughout the major axial extent thereof, said vortex finder having a wall spaced from said tubular wall to form therebetween in said cylindrical section an annular chamber, said conical section having therein a conical chamber communicating with said annular chamber and the interior of said vortex finder, said conical chamber having an apex remote from said cylindrical section and an orifice at said apex, a tubular member mounted on said conical section, said tubular member having an axial opening therein in axial alignment and direct communication with said apex orifice, said axial opening having a tapered wall surface of gradually increasing diameter from said orifice, a feed pipe leading tangentially into said annular chamber, and a discharge pipe leading from said annular chamber.

The invention will be described with reference to the accompanying drawings, in which
FIGURE 1 is a sectional elevation of a cyclone in accordance with the invention,
FIGURE 2 is a bottom plan view of the cyclone,
FIGURES 3 and 4 are diagrammatic layouts illustrating practical applications of the use of a single cyclone,
FIGURE 5 is a diagrammatic layout of a two-stage circuit,
FIGURE 6 is a diagrammatic layout of another form of two-stage circuit,
FIGURE 7 is a sectional elevation of a multi-cyclone apparatus, and
FIGURE 8 is a sectional plan view of the apparatus shown in FIGURE 7.

Referring to FIGURES 1 and 2, the cyclone 10 shown comprises an upper cylindrical section 11 and a lower conical section 12. The cylindrical section 11 constitutes a minor portion and the conical section 12 a major portion of the axial length of the cyclone. The included angle of the wall taper of the conical section is in the range of 5° to 45° and may be about 20°. The axial extent of conical section 12 will normally be two to three times that of the cylindrical section.

A tubular vortex finder 13 is coaxially mounted within section 11. The vortex finder extends throughout the major portion of the length of section 11 and terminates at its upper end in spaced relation to the top wall 14 of the cyclone and at its lower end at or slightly above the plane of the lower end of the section 11.

Conical section 12 has an apex orifice or axial outlet 15 at its lower end. Mounted on such lower end, as by means of bracket members 16 and 17, is a tubular slugging device 18. Device 18 has an axial opening 19 in coaxial alignment and direct communication with outlet 15.

Opening 19 is of gradually increasing diameter from top to bottom thereof. The included angle of the taper on the wall of such opening may be in the neighbourhood of 4° and will ordinarily be in the range of 1° to 10°. The minimum diameter at the top will ordinarily be substantially the same as the diameter of orifice 15.

It will be apparent that the interior of the cyclone comprises an upper annular chamber 21 surrounding vortex finder 13 and a lower conical chamber 22. A feed inlet pipe 23 has tangential communication with chamber 21. An overflow discharge pipe 24 communicates with the space between the upper end of vortex finder 13 and the top wall. A vacuum regulating valve 25 is axially arranged in top wall 14.

The cyclone may be made of any suitable material such as metal, plastic composition, or the like. Device 18 may desirably be of ceramic composition. It is subject to ready replacement with a similar device having an axial opening of different included angle.

In accordance with the invention, compaction of solids inside the cyclone is achieved essentially by imparting to the suspension centrifugal accelerations in the order of 300 to 400 times the acceleration of gravity. Attainment of accelerations of this degree requires high inlet pressures, which are not practical to obtain in cyclones having a chamber diameter substantially exceeding four inches.

The desired g-ratios are attained with inlet pressures of 25–40 p.s.i. when processing pulps in cyclones having a maximum chamber diameter, for instance, of two to three inches. This size range has been found to be quite satisfactory for successful removal of particles of −28 mesh of various types of materials.

The pulp, slurry, or suspension is fed into the cyclone through inlet 23 under the required pressure. Under the resulting centrifugal acceleration, the granular material moves towards the wall of chamber 22 and water is removed therefrom by the vacuum created along the axis of the chamber. This water flows axially upwardly through the vortex finder and out of the discharge 24.

The granular material moves downwardly through orifice 15 into the opening 19 of device 18. Vacuum in the cyclone causes atmospheric air to enter through orifice 15 in countercurrent flow to the passage of granular material and to displace free water between the particles passing through the orifice.

The tapered opening 19 through which the compacted solids move effects a symmetrical and even distribution of the air around the periphery of the compacted body as it moves downwardly therethrough. Air is not prevented from penetrating through the central portion of the slug under formation. In this central portion, the particles are smaller and a weak spot may tend to develop as a result of greater fluidity in this area.

The balance between the air pressure and the resistance of the rope or slug as it moves from the cyclone may be maintained by regulating the vacuum inside the cyclone as by means of a vacuum regulating valve 25 in the top wall 14. Under optimum conditions the passage of air through the cyclone is such that the vacuum is sufficient for the removal of "free" water from the compacted product while not high enough ot cause air to break through the weak center of the rope or slug under formation.

It will be apparent that, if the solids content of the product is high, say about 55% or more, the discharge from the cyclone will be in the form of separate slugs, as indicated at 27. The dewatered granular mass moving through the opening 19 loses its coherence through lack of surface tension previously provided by the interstitial moisture and breaks into slugs of a semi-solid consistency. If the solids content is low, a "rope" discharge of compacted solids will occur.

FIGURES 3 and 4 are flow diagrams showing use of a single cyclone for producing a solids product from a feed containing at least 10% solids by weight. Each diagram includes a pump 26 in the feed line. In FIGURE 3, the solids content of the feed is 30%, of the compacted product 65%, and of the overflow discharge 11%.

In FIGURE 4, the solids content of the feed is 10%, of the compacted product 55%, and of the overflow discharge 5%.

When the solids in the suspension are 10% by weight or less, it is usually difficult to produce a slug in a single step; a rope discharge will occur, indicating a lower percent solids. FIGURE 5 illustrates a two-stage circuit for pre-densifying effluents with low solids contents. The primary feed to feed hopper 28 is fed by means of pump 29 to a primary cylone 30 which produces an underflow of 30–50% solids. This underflow is directly passed to a secondary cyclone 31 with a small fraction of the classifier overflow through line 32 for producing the necessary inlet pressure. The overflow from cyclone 31 is returned to feed. The return water may contain as low as 1% solids. Thus, this system is suitable for disposal of effluent solids in the form of paste and the production of re-usable water for the main plant.

When the effluent solids content is high (say 20–30% by weight) and a clean overflow is required, as well as solids in the form of paste, a two-stage circuit such as shown in FIGURE 6 may be employed. In this circuit, the feed containing 15–25% solids from hopper 33 is supplied through pump 34 to a cyclone 35. The overflow from this cyclone, containing 15–25% solids, is fed to a second cyclone 36 through pump 37. The underflow containing 60–65% solids is returned to the primary feed.

Thus, the feed to cyclone 35 is about 20–30% solids. The final solids product contains about 75–75% solids and the overflow (from cyclone 36) about 12% solids.

Since, as previously mentioned, the most practical form of a cyclone in accordance with the invention is one having a maximum diameter of about four inches, it may be desirable in practice to employ such cyclones in clusters of, say, 16, 20 or more. FIGURES 7 and 8 illustrate one such arrangement wherein a plurality of cyclones 38 are suspended from a common support plate 39. Feed is provided from a common, centrally positioned pipe 40 from which branches 41 lead to the various cyclones.

The vortex finders 42 of the cyclones extend into a common overflow chamber 43 formed by a housing member 44 mounted on plate 39. The overflow discharges from chamber 43 through a central annular passage 45 formed by an upstanding tubular wall 46 on member 44 surrounding a portion of feed pipe 40, and a discharge pipe 47.

Means may be provided for regulating the vacuum in the cyclones and, as shown, comprises a hood 48 surmounting housing member 44 and forming therewithin a chamber 49. Member 44 has therein a plurality of openings 50 providing communication between chambers 43 and 49. A valve 51 in hood 48 is employed to control pressure in the cyclones and communicating chambers.

I claim:

1. A cyclone for removing solids in paste form from liquid suspensions which comprises a top wall, a tubular wall extending from said top wall and forming a right cylindrical section of minor axial extent, and a conical section of major axial extent in coaxial adjoining relation to said cylindrical section, a right cylindrical vortex finder coaxially disposed within said cylindrical section and extending throughout the major axial extent thereof, said vortex finder having a wall spaced from said tubular wall to form therebetween in said cylindrical section an annular chamber, said conical section having therein a conical chamber communicating with said annular chamber and the interior of said vortex finder, said conical chamber having an apex remote from said cylindrical section and an orifice open to atmosphere at said apex, a tubular member mounted on said conical section, said tubular member having an axial opening therein in axial alignment and direct communication with said apex orifice, said axial opening having a tapered wall surface of gradually increasing diameter from said orifice, a valve in said top wall to regulate passage of atmospheric air through said axial opening and said apex orifice, a feed pipe leading tangentially into said annular chamber, and a discharge pipe leading from said annular chamber.

2. A cyclone as defined in claim 1, wherein said axial opening of said tubular member has a diameter at one end thereof adjoining said orifice approximately equal to that of said orifice, and wherein the included angle of said tapered wall surface is 1° to 10°.

3. A cyclone as defined in claim 2, wherein said included angle is about 4°.

4. A cyclone as defined in claim 2, wherein the axial extent of said conical section is two to three times that of said cylindrical section.

5. A cyclone as defined in claim 4, said conical chamber having a tapering wall surface the included angle of which is about 20°.

6. A cyclone as defined in claim 1, including means removably mounting said tubular member on said conical section.

7. A cyclone as defined in claim 1, each of said chambers having a maximum diameter of four inches.

8. A cyclone as defined in claim 1, each of said chambers having a diameter of two to three inches.

9. A cyclone assembly comprising a support plate, a plurality of cyclones suspended from said plate, each said cyclone having an upper right cylindrical section adjoining said plate, a lower conical section, a right cylindrical vortex finder coaxially disposed within said cylindrical section, said conical section having an axial extent several times that of said cylindrical section, an annular chamber surrounding said vortex finder, and a conical chamber in said conical section and having an apex remote from said cylindrical section and an orifice open to atmosphere at said apex, a tubular member mounted on said conical section, said tubular member having an axial opening in axial alignment and direct communication with said apex orifice, said axial opening having a tapered wall surface of gradually increasing diameter to provide an included angle of 1° to 10°, a housing member mounted on said support plate and forming therewith an overflow chamber, each said vortex finder extending into said overflow chamber, an outlet pipe leading from said overflow chamber, a feed pipe having a plurality of branches each communicating with one of said annular chambers, and means for regulating passage of atmospheric air through said cyclone comprising a wall forming an air chamber surmounting said housing member, said housing member having openings therein providing communication between said air chamber and said overflow chamber, and a valve in said wall.

References Cited

UNITED STATES PATENTS 2,301,371 11/1942 Corwin _____ 210—512 X
2,765,918 10/1956 Fontein _____ 210—512

FOREIGN PATENTS 541,784 10/1955 Belgium.
693,649 7/1953 Great Britain.

REUBEN FRIEDMAN, *Primary Examiner.*

J. L. DE CESARE, *Assistant Examiner.*